(12) United States Patent
Patel

(10) Patent No.: US 10,822,565 B2
(45) Date of Patent: Nov. 3, 2020

(54) METHOD FOR CONVERTING AGRICULTURAL BIOMASS OR INDUSTRIAL BIO WASTE INTO BIOFUEL

(71) Applicant: Alp Multitech Pvt. Ltd., Gujarat (IN)

(72) Inventor: Arvindbhai Lavjibhai Patel, Gujarat (IN)

(73) Assignee: ALP MULTITECH PVT. LTD., Gujarat (IN)

( * ) Notice: Subject to any disclaimer, the term of this patent is extended or adjusted under 35 U.S.C. 154(b) by 0 days.

(21) Appl. No.: 16/112,262

(22) Filed: Aug. 24, 2018

(65) Prior Publication Data
US 2019/0256788 A1    Aug. 22, 2019

(30) Foreign Application Priority Data
Feb. 21, 2018  (IN) .............................. 201821006576

(51) Int. Cl.
| | | |
|---|---|---|
| C10L 5/44 | (2006.01) | |
| C10B 19/00 | (2006.01) | |
| C10B 23/00 | (2006.01) | |
| C10B 53/02 | (2006.01) | |

(52) U.S. Cl.
CPC .............. *C10L 5/445* (2013.01); *C10B 19/00* (2013.01); *C10B 23/00* (2013.01); *C10B 53/02* (2013.01); *C10L 5/442* (2013.01); *C10L 2200/0476* (2013.01); *C10L 2200/0484* (2013.01); *C10L 2290/08* (2013.01); *C10L 2290/36* (2013.01); *C10L 2290/58* (2013.01); *F23G 2204/203* (2013.01)

(58) Field of Classification Search
CPC combination set(s) only.
See application file for complete search history.

(56) References Cited

U.S. PATENT DOCUMENTS

| | | | |
|---|---|---|---|
| 8,841,101 B2 | 9/2014 | Medoff | |
| 9,068,133 B2 | 6/2015 | Petry et al. | |
| 2008/0086946 A1* | 4/2008 | Weimer | B01J 19/127 48/89 |
| 2011/0256615 A1 | 10/2011 | Brady et al. | |
| 2011/0290788 A1* | 12/2011 | Klemarewski | C10B 19/00 219/680 |
| 2015/0083571 A1* | 3/2015 | Catto | C10B 47/44 201/4 |

* cited by examiner

*Primary Examiner* — Ellen M McAvoy
*Assistant Examiner* — Chantel L Graham
(74) *Attorney, Agent, or Firm* — Spencer C. Patterson; Grable Martin Fulton PLLC

(57) ABSTRACT

A method for converting agricultural biomass or industrial bio waste into biofuel using concentrated radiated energy is disclosed. Biomass or bio waste is stored inside a batch reactor in either solid or semisolid state. Unwanted moisture and unwanted oxygen are removed from the stored agricultural biomass or industrial bio waste. Concentrated radiated energy is directed towards the biomass or bio waste through a radiated energy concentrator that focuses the concentrated radiated energy. Biomass or bio waste is kept within the depth of focus of the concentrated radiated energy during the conversion operation. Due to substantial matching of the absorption peak of biomass or bio waste with the emission peak of the concentrated radiated energy, the biomass or bio waste that is within the depth of focus instantaneously decomposes into biofuel. The biofuel thus generated is at ambient temperature with higher energy density.

16 Claims, 1 Drawing Sheet

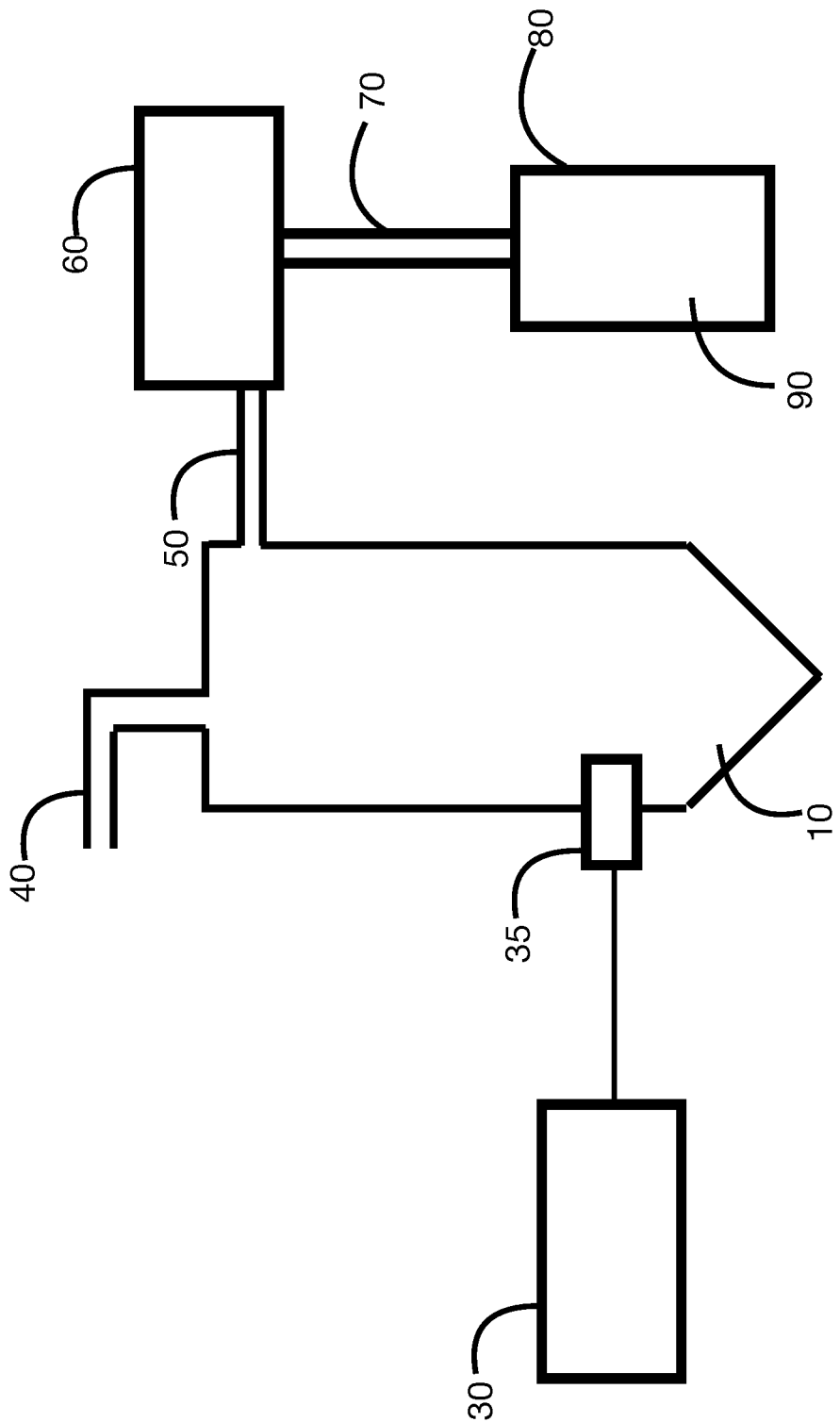

METHOD FOR CONVERTING AGRICULTURAL BIOMASS OR INDUSTRIAL BIO WASTE INTO BIOFUEL

FIELD OF THE INVENTION

The present invention relates to a method to generate biofuel (90) from agricultural biomass (10) or industrial bio waste. The present invention further relates to use of radiant energy (30) to convert agricultural biomass (10) or industrial bio waste into biofuel.

USE OF THE INVENTION

The method in accordance with the present invention, owing to its simplicity, can find numerous uses that require a gaseous fuel. Any application using gas as fuel, such as an industrial burner or even an automobile can use the method in accordance with the present invention. The method in accordance with the present invention can be effectively used to convert crop waste biomass into biofuel thereby obviating the need to burn the crop waste to get rid of it. Thus, if the present invention is employed to convert crop waste into biofuel, it will not only significantly reduce air pollution caused by crop waste burning, but it will generate useful biofuel from the crop waste and that too with high yield.

An advantage of the present invention is that it is simple to use the method in accordance with the present invention to generate biofuel (90) from agricultural biomass or industrial bio waste.

Another advantage of the present invention is that no fire that would have to be extinguished is required for the conversion of agricultural biomass (10) or industrial bio waste into biofuel (90). The conversion of agricultural biomass (10) or industrial waste is instantaneous that requires no heating or burning of biomass (10) or bio waste by using any external means. The instantaneous conversion caused by the concentrated radiated energy (30) happens in a small fraction of a second. The conversion instantaneously stops as soon as the concentrated radiated energy (30) ceases to be directed towards the agricultural biomass (10) or industrial bio waste. In other words, unlike the conventional conversion process that requires a heating source to start the combustion reaction, the conversion started by the present invention can be instantaneously stopped requiring no means to control the heat energy that would be otherwise required in a conventional conversion process.

Yet another advantage of the present invention is that conversion of agricultural biomass (10) or industrial bio waste occurs at ambient temperature which requires no heat recovery from the product gas stream after completion of the conversion.

A further advantage of the present invention is that the biofuel (90) generated can be put to use immediately or stored for future use.

An additional advantage of the present invention is that there is hardly any waste of agricultural biomass (10) or industrial biowaste resulting in high yield of biofuel (90).

Yet another advantage of the present invention is that the produced biofuel (90) is free from acid gases such as hydrogen sulphide or mercaptans which forgo the cost of refining that is inevitable in the case of natural gas.

A significant advantage of the present invention is that it obviates the need for having landfills for disposing industrial bio waste that can be converted into biofuel (90). Use of the method in accordance with the present invention can lead to reduced acid rain, smog and greenhouse gas production. Thus, there are huge environmental benefits that the method in accordance with the present invention offers.

Prior Art and Problem to be Solved

Conventional systems and methods to obtain biofuel (90) by conversion of agricultural biomass (10) or industrial bio waste use heat, electrical power, etc. Lately, systems have been developed which use microwave frequency or radiation from various sources to convert the stored agricultural biomass (10) or industrial bio waste into biofuel (90). However, there are several drawbacks with the existing conventional methods. First, these methods need a highly controlled environment and atmospheric conditions in order to carry out the conversion. Second, these methods need some persons of reasonable expertise in the field to carry out the conversion process. Apart from these drawbacks, these conventional methods do not have much efficiency resulting in a lot of waste of agricultural biomass (10) or industrial bio waste. Also, the wastage like tar and charred material is very high which results in lower biofuel (90) generation yield and low energy density product.

U.S. Pat. No. 9,068,133 discloses "Methods and procedures for producing useful products from waste materials". The patent discloses a method for producing coal, asphalt, liquid hydrocarbon, organic acids, methane gas and/or hydrogen from a waste material wherein the waste material is subjected to irradiation with low frequency macro waves. Based on the pressure and temperature at which the material is subjected to irradiation, the by-products would be in gaseous, solid or liquid state. However, such methods are economically less feasible and also need expert personnel to be deployed in order to carry out the reaction. In other words, the reaction needs to be carried out under conditions which need to be constantly monitored by experts. Moreover, there is a lot of waste product which makes the reaction not efficient.

U.S. Pat. No. 8,841,101 discloses a method of processing biomass. The patent relates to processing biomass to compositions including saccharide units arranged in a molecular chain to methods of producing amino acids or antibiotics to methods of producing edible or immunostimulatory material and to products of such methods. However, the described techniques need a lot of raw material i.e. biomass in order for obtaining a minimal amount of biofuel i.e. the desired quantity of biofuel. Also, there is a lot of waste in terms of unwanted or unnecessary material leading to lower efficiency of the process.

US Patent Application No. 20110256615 discloses "Modification of biomass for efficient conversion to fuels". The application discloses a process for preparing biomass particles for thermolytic or enzymatic conversion whereby the biomass particles having a moisture content of at least 20% are subjected to flash heating. The flash heating may be preceded by one or more adsorption/desorption cycles with water or steam. A swelling aid may be added during the adsorption part of an adsorption/desorption cycle. However, this patent application uses a method of flash heating which is hazardous and also leads to wastage of the useful materials which need to be obtained using the biomass.

Hence, there exists a need for a reliable method which can be used to produce biofuel (90) from agricultural biomass (10) or industrial bio waste. Moreover, there exists a need for methods which are non-hazardous and those that do not need highly controlled environment or atmospheric conditions in order to carry out the conversion. The prior methods do not have much efficiency and a lot of agricultural biomass (10) or industrial bio waste is utilized to generate an insignificant quantity of biofuel (90). Also, the wastage like tar and charred material is very high which results in a lower biofuel (90) yield. Moreover, they use air or oxygen to continue a combustion reaction which reduces energy density of the product fuel significantly. As the by-product of combustion/Pyrolysis process generates at elevated temperature, it is essential for conventional methods to integrate with heat recovery unit which in turn raises production cost of the biofuel (90). Hence, there exists a need for a simple and economical method which can be used to obtain substantial amount of biofuel (90) with high energy density from agricultural biomass (10) or industrial bio waste.

OBJECTS OF THE INVENTION

The principal object of the present invention is to provide a simple method that does not require an expert to use the method to generate biofuel (90) from agricultural biomass (10) or industrial bio waste.

It is also an object of the present invention that no fire that would have to be extinguished for the conversion of agricultural biomass (10) or industrial bio waste into biofuel (90).

Yet another object of the present invention is that the conversion of agricultural biomass (10) or industrial bio waste occurs at ambient temperature.

Another object of the present invention is that no heat recovery unit is required for the by product.

A further object of the present invention is that the biofuel (90) generated can be put to use immediately or stored for future use.

Yet another object of the present invention is that there is hardly any waste of agricultural biomass (10) or industrial bio waste resulting in high yield of biofuel (90).

Another object of the present invention is that there is no requirement of using air or oxygen to produce the biofuel (90) which results in higher energy density of the product as compared to conventional process.

A further object of the present invention is that the generated biofuel (90) does not require any complicated refining process for removal of toxic acid gases such as hydrogen sulphide and mercaptans as in case of natural gas.

SUMMARY OF THE INVENTION

In a batch reactor (20), agricultural biomass (10) or industrial bio waste is stored. Such agricultural biomass (10) or industrial bio waste can be solid or semisolid. The batch reactor (20) is connected to a vacuum chamber (not shown). Once agricultural biomass (10) or industrial bio waste is stored inside the batch reactor (20), unwanted moisture and unwanted oxygen are removed from the batch reactor (20).

The next step is to direct concentrated radiated energy (30) towards the agricultural biomass (10) or industrial biowaste stored inside the batch reactor (20). The type and wavelength of the concentrated radiated energy (30) depends on the absorption wavelength of the agricultural biomass (10) or industrial bio waste, as the case may be. The rate at which biofuel (90) is to be generated will determine the density of the concentrated radiant energy (30). Or, the density of the concentrated radiated energy (30) will directly impact the rate at which biofuel (90) is generated.

Using a radiated energy concentrator (35), appropriate depth of focus of the concentrated radiated energy (30) is arrived at. The present invention ensures that at any given time during the conversion operation, the agricultural biomass (10) or industrial bio waste stored inside the batch reactor (20) remains within the depth of focus of the concentrated radiated energy (30).

The biofuel (90) generated in accordance with the present invention can be immediately put to use or it can be pumped for storage inside a leak proof vessel (80).

DETAILED DESCRIPTION OF THE INVENTION

The present invention is illustrated in the accompanying drawing. FIG. 1 shows the general arrangement of the components that the method in accordance with the present invention requires to generate biofuel (90) from biomass (10).

As shown in FIG. 1, agricultural biomass (10) or industrial bio waste is stored in a batch reactor (20). The batch reactor (20) can be, for example, an airtight enclosed metallic or ceramic structure. Agricultural biomass (10) or industrial biowaste can be solid or semisolid.

Outlet (40) connects the batch reactor (20) with a vacuum chamber (not shown). Using vacuum pressure applied through outlet (40), the unwanted moisture and unwanted oxygen are removed from the batch reactor (20). A presence of moisture or oxygen causes an undesirably higher level of carbon dioxide and carbon monoxide generation in addition to the desired level of methane generation. To avoid generation of unwanted carbonaceous gases, moisture and oxygen are removed as much as possible—desirably, 100%. At −3 atmospheric pressure, system can become nearly if not entirely 100% air-free (including all oxygen and moisture; any trace presence of other gases is also desirably removed).

A source of concentrated radiated energy (30), which generally is either a CO or $CO_2$ or Fiber laser, is used, but the type of radiant energy source is not limited to a laser or the particular types of lasers. For example, Continuous Wave (CW) or Pulsed Laser can be used. Quasi Continuous Wave (QCW) can also be used. In some embodiments, average output power (laser power) greater than 20 W is suitable. Any other focused light beam can also be used, such as high power LED, if available.

The density of the concentrated radiated energy (30) or laser depends on the required rate of biofuel (90) generation. The type and wavelength of the concentrated radiated energy source (30) depends on the absorption wavelength of agricultural biomass (10) or industrial bio waste. In general, biomass contains three basic constituents which are: cellulose, hemicellulose, and lignin. Absorption peaks of these three constituents are well described in prior arts or discoverable by persons of ordinary skill in the field. Fourier-Transform Infrared Radiation (FTIR) Spectroscopy is also available for determining absorption wavelength of biomass or bio waste in practical. According to the major absorption peak of biomass or bio waste, the specific radiant energy source is selected. For example, if a biomass or bio waste sample is high in lignin content, then $CO_2$ laser operating at 10.6 μm is selected due to the broad absorption peak of lignin around 10.4 μm.

Concentrated radiated energy (30) is directed towards the agricultural biomass (10) or industrial bio waste through a radiated energy concentrator (35) which is essentially a focusing device (e.g., a focusing lens or mirrors) that focuses the concentrated radiated energy (30). The method in accordance with the present invention ensures that agricultural biomass (10) or industrial bio waste remains within the depth of focus of the concentrated radiated energy (30)

during the conversion operation. The biomass or bio waste gets converted into biofuel on contact with laser or other concentrated radiant energy. At any given time during conversion operation, a presence of biomass or biowaste within the depth of focus is ensured by letting the biomass or bio waste fall due to gravity. Depth of focus of the radiated energy can be adjusted by adjusting the position of mirrors and focusing lens so that any remaining biomass or bio waste can also be converted.

The agricultural biomass (10) or industrial bio waste that is within the depth of focus instantaneously decomposes into biofuel (90) in the absence of unwanted moisture and unwanted oxygen. The shape of the depth of focus (DOF) of the laser or other concentrated radiant energy will be more or less like an hour-glass placed horizontally and the depth of focus will be the length of the hour-glass so placed. The focal point of the laser will be in the middle of the length of the hour-glass placed horizontally. The depth of focus can be calculated from the equation written below and can be experimentally verified (e.g., using a reflecting mirror):

$$DOF = \pm 0.5 (\lambda/NA2)$$

where, $\lambda$ is wavelength of the laser beam and NA is numerical aperture of the lens.

Biofuel (90) so generated can be put to use immediately, or using pump (60) it can be transported through ducting (50) and (70) for storage inside a leak proof vessel (80).

Biofuel (90) generated in accordance with the present invention will always be in a gaseous state and that too at ambient temperature.

BEST METHOD OF PERFORMING THE INVENTION

In the best method of performing the invention, agricultural biomass (10) or industrial biomass (10) having absorption wavelength from 2 microns to 12 microns is used. The agricultural biomass (10) or industrial waste is stored inside the batch reactor (20) broken down in particles or powder. An absorption peak of agricultural biomass (10) or industrial bio waste is substantially matched with the emission peak of the concentrated radiated energy (30).

The concentrated radiated energy (30) is directed towards the agricultural biomass (10) or industrial bio waste through a radiated energy concentrator (35) which is essentially an optical focusing device that focuses the concentrated radiated energy (30). The method in accordance with the present invention ensures that agricultural biomass (10) or industrial bio waste remains within the depth of focus of the concentrated radiated energy (30) during the conversion operation.

Due to substantial matching of the absorption peak of agricultural biomass (10) or industrial bio waste with the emission peak of the concentrated radiated energy (30), the agricultural biomass (10) or industrial bio waste that is within the depth of focus instantaneously decomposes into biofuel (90) in the absence of unwanted moisture and unwanted oxygen.

As a person skilled in the art will readily understand from the detailed description of the present invention, merely because some changes may be made to the method described herein above without departing from the spirit and scope of the present invention, so modified method should not be construed to fall outside the scope of the present invention as disclosed and claimed herein. All matters disclosed hereinabove or as shown in the accompanying drawing ought to be interpreted as illustrative and not in a limiting sense.

The following claims are intended to cover all of generic and specific features of the present invention described herein above and all the statements of scope of the present invention regardless of grammatical or linguistic variations might be said to fall there between.

I claim:

1. A method for converting agricultural biomass into biofuel comprising the steps of;
   storing agricultural biomass in a batch reactor,
   substantially removing moisture and oxygen from the stored agricultural biomass;
   utilizing a concentrated radiant energy source to convert the agricultural biomass stored inside the batch reactor into biofuel by directing concentrated radiant energy towards the agricultural biomass using a radiating energy concentrator such that the agricultural biomass is within the depth of focus of the concentrated radiated energy.

2. The method of claim 1, wherein an absorption wavelength of the stored agricultural biomass is in a range of 2 microns to 12 microns.

3. The method of claim 1, wherein the absorption peak of the stored agricultural biomass substantially matches an emission peak of the concentrated radiant energy.

4. The method of claim 1, wherein the concentrated radiant energy source comprises a CO, $CO_2$ or Fiber laser.

5. The method of claim 1, wherein a density of the concentrated radiant energy is selected according to a desired rate of biofuel generation.

6. A method for converting industrial bio waste into biofuel comprising the steps of:
   storing industrial bio waste in a batch reactor;
   substantially removing moisture and oxygen from the stored industrial bio waste;
   utilizing a concentrated radiant energy source to convert the industrial bio waste stored inside the batch reactor into biofuel by directing concentrated radiant energy towards the industrial bio waste using a radiating energy concentrator, such that the industrial bio waste is within the depth of focus of the concentrated radiated energy.

7. The method of claim 6, wherein an absorption wavelength of the stored industrial bio waste is in a range of 2 microns to 12 microns.

8. The method of claim 6, wherein the absorption peak of the stored industrial bio waste substantially matches an the emission peak of the concentrated radiant energy.

9. The method of claim 6, wherein the concentrated radiant energy source comprises a CO, $CO_2$ or Fiber laser.

10. The method of claim 6 wherein a density of the concentrated radiant energy is selected based on a desired rate of biofuel generation.

11. The method of claim 1 wherein the radiating energy concentrator comprises an optical focusing device.

12. The method of claim 1 wherein the agricultural biomass stored inside the batch reactor is converted into biofuel without heating the biomass.

13. The method of claim 1 wherein the conversion of the agricultural biomass stored inside the batch reactor into biofuel occurs at ambient temperature.

14. The method of claim 6 wherein the radiating energy concentrator comprises an optical focusing device.

15. The method of claim 6 wherein the industrial biomass stored inside the batch reactor is converted into biofuel without heating the biomass.

16. The method of claim 6 wherein the conversion of the industrial biomass stored inside the batch reactor into biofuel occurs at ambient temperature.

\* \* \* \* \*